US009261118B2

(12) United States Patent
Zhang et al.

(10) Patent No.: US 9,261,118 B2
(45) Date of Patent: Feb. 16, 2016

(54) BOOM CYLINDER DIG FLOW REGENERATION

(71) Applicant: Caterpillar, Inc., Peoria, IL (US)

(72) Inventors: Jiao Zhang, Naperville, IL (US); Pengfei Ma, Naperville, IL (US); Vickram Murugesan, Plainfield, IL (US); Tonglin Shang, Bolingbrook, IL (US); Bryan Jacob Hillman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 92 days.

(21) Appl. No.: 14/155,587

(22) Filed: Jan. 15, 2014

(65) Prior Publication Data

US 2015/0197915 A1 Jul. 16, 2015

(51) Int. Cl.

| | |
|---|---|
| ***F16B 21/14*** | (2006.01) |
| ***E02F 3/43*** | (2006.01) |
| ***F15B 21/14*** | (2006.01) |
| ***E02F 9/22*** | (2006.01) |

(52) U.S. Cl.

CPC ............... *F15B 21/14* (2013.01); *E02F 9/2228* (2013.01); *E02F 9/2296* (2013.01)

(58) Field of Classification Search

CPC ....... F15B 21/14; E02F 9/2228; E02F 9/2296
USPC ........................................................... 701/50
See application file for complete search history.

(56) References Cited

U.S. PATENT DOCUMENTS

| | | | | |
|---|---|---|---|---|
| 5,415,076 A * | 5/1995 | Krone | F15B 11/024 | 91/421 |
| 6,502,393 B1 * | 1/2003 | Stephenson | F15B 11/006 | 60/414 |
| 6,748,738 B2 * | 6/2004 | Smith | E02F 9/2217 | 60/414 |
| 6,789,387 B2 * | 9/2004 | Brinkman | E02F 9/2217 | 60/414 |
| 7,905,088 B2 * | 3/2011 | Stephenson | E02F 9/2217 | 60/414 |
| 8,857,168 B2 * | 10/2014 | Opdenbosch | E02F 9/2217 | 60/414 |
| 2004/0107699 A1 * | 6/2004 | Fales | F15B 1/024 | 60/414 |
| 2008/0110166 A1 * | 5/2008 | Stephenson | E02F 9/2217 | 60/414 |
| 2012/0260641 A1 | 10/2012 | Opdenbosch | | |
| 2013/0229272 A1 | 9/2013 | Elliott | | |

FOREIGN PATENT DOCUMENTS

| | | |
|---|---|---|
| JP | 10311305 | 11/1998 |
| JP | 2008-121893 | 4/2005 |
| JP | 2006-292091 | 10/2006 |
| JP | 2009250204 | 10/2009 |
| JP | 2012-172491 | 9/2012 |
| WO | 2012129042 | 9/2012 |
| WO | 2012161628 | 11/2012 |

* cited by examiner

*Primary Examiner* — Thomas Tarcza
*Assistant Examiner* — Tyler J Lee
(74) *Attorney, Agent, or Firm* — Miller, Matthias & Hull LLP; M. Daniel Spillman

(57) ABSTRACT

A hydraulic system and methods for conserving energy in such system is disclosed. The hydraulic system includes a hydraulic actuator having a head end, a rod end and a piston disposed therebetween. The system also includes a pump that pumps fluid to the actuator, a first valve disposed downstream of the rod end, and a second valve disposed between the pump and the head end of the actuator. When the system is in a load overrunning condition, the second valve is partially closed to restrict the flow of a combined fluid. The combined fluid including fluid received from the pump and fluid received from the rod end of the actuator. When the system is in the light resistive load condition, the second valve is open to allow the combined fluid to flow through the second valve.

20 Claims, 6 Drawing Sheets

BOOM CYLINDER DIG FLOW REGENERATION

TECHNICAL FIELD

The present disclosure relates to energy conservation, and more particularly to a system and method for conserving energy in a hydraulically powered linkage system.

BACKGROUND

In a machine, such as an excavator, a backhoe or a shovel, a hydraulic circuit may include a variable displacement pump in fluid communication with one or more hydraulic actuators to handle a variable load. The pump provides pressurized hydraulic fluid to each of the actuators, such as a hydraulic cylinder or a hydraulic motor, to move the load. The actuators may be connected to work implements, such as a boom, stick, bucket and/or swing gear train.

A typical digging operation for an excavator or other machine with an implement, may have a plurality of phases. Such phases may include, but are not limited to, an initial phase, a digging phase, a digging-boom-up-overrunning-load phase, a digging-boom-up-light-resistive-load phase and a boom-lift phase. In the initial phase, there is no digging load and the boom, stick and bucket are moved into position to begin digging. In the digging phase, the boom is generally held in place while an implement, for example a stick and bucket, attached to the boom digs. In the digging-boom-up-overrunning-load phase, the boom is moved upward while the implement is digging. In such phase, the reaction digging force applied on the boom cylinder through the implement is greater than the resistive force of gravity. In the digging-boom-up-light-resistive-load phase, the boom is moved upward while the implement is digging but the reaction digging force is less than the resistive force of gravity. In the boom-lift phase, the implement is no longer digging and the boom is moved upward along with the load contained in the implement.

When the hydraulic circuit transitions between the digging phase to the digging-boom-up-overrunning-load phase, the boom portion of the hydraulic circuit generally transitions from a holding operation to a lifting operation, the bucket and stick circuits carry a high digging load, and the pump must supply fluid at high pressure to support the digging function. As a result, for a short period of time, for example, about 0.5 to about 2 seconds, the boom cylinder may be in an overrunning load condition. When lifting the boom with an overrunning load condition, the head end of the actuator for the boom receives pump flow with a greater pressure than necessary which, consequently, may cause pressure modulation by a compensation valve disposed downstream of the pump and upstream of the head end of the actuator. A relatively large amount of power may be dissipated due to the fluid pressure drop across the compensation valve. Similar power dissipation may occur when the hydraulic circuit transitions to the digging-boom-up-light-resistive-load phase. This power dissipation could be reduced.

JP2012-172491 discloses a hydraulic system that includes a flow volume limiting means which limits the flow volume supplied to the head side of a boom hydraulic cylinder from a hydraulic pump. Such restriction occurs only at the time of a boom raising operation where the rod lateral-pressure force of the boom hydraulic cylinder is higher than the head lateral-pressure force. A better system is desired for conserving energy in a hydraulic system.

SUMMARY OF THE DISCLOSURE

In one aspect, a method for conserving energy in a hydraulic system is disclosed. The hydraulic system may include a pump, a hydraulic actuator, a first valve, and a second valve. The hydraulic actuator may include a head end, a rod end, and a piston disposed inside the actuator between head end and the rod end. The first valve may be disposed between the rod end and a fluid reservoir, and may be disposed between the rod end and the second valve. The second valve may be disposed between the pump and the head end. The method may comprise determining when the hydraulic system is in an overrunning load condition, a light-resistive load condition or a heavy-resistive load condition, and, when the hydraulic system enters the overrunning load condition, receiving by the head end regenerated fluid.

In an embodiment, the method may further comprise, when the hydraulic system enters the overrunning load condition, closing the first valve and combining fluid flowing from the rod end with fluid flowing from the pump, and receiving by the head end fluid flow from a make-up circuit. In a refinement, the method may further comprise restricting the flow of combined fluid to the head end by partially closing the second valve. In a further refinement, the method may further comprise, when the hydraulic system enters the light resistive load condition from the overrunning load condition, decreasing the restriction of the combined fluid through the second valve, increasing the fluid flow from the pump to the head end of the actuator, and reducing fluid flow to about zero from the make-up circuit to the head end.

In another embodiment, the method may further comprise determining when the hydraulic system transitions from the light-resistive load condition to the heavy-resistive load condition and, as a result of determining the transition from the light resistive load condition to the heavy resistive load condition, opening the first valve to allow fluid from the rod end to flow to the reservoir.

In another embodiment, the method may further comprise receiving a first fluid pressure measurement of fluid in a fluid line connected to the actuator head end and a second fluid pressure measurement of fluid in a rod end line connected to the actuator rod end, and estimating load condition based at least in part on a comparison of a head end actuator force to a rod end actuator force. The head end actuator force determined by the first fluid pressure measurement times a front surface area of a face of the piston. The rod end actuator force determined by the second fluid pressure measurement times a back surface area of a back of the piston. The face of the piston proximal to the head end, and the back of the piston proximal to the rod end. In a refinement, a transition to the heavy-resistive load may be detected when (a) the head end actuator force is greater than the rod end actuator force, and (b) the first fluid pressure measurement is in a range of about an initial pressure of the fluid output from the pump to about ninety percent of the initial pressure of the fluid output from the pump. In another refinement, a transition to the light-resistive load may be detected when the head end actuator force is greater than the rod end actuator force.

In another embodiment, the hydraulic system may further include a third valve between the rod end of the actuator and the compensation valve, and the method may further include opening the third valve when the first valve is substantially closed, and receiving, by the third valve, fluid from the rod end when the first valve is substantially closed.

In another aspect, a hydraulic system is disclosed. The hydraulic system may comprise a hydraulic actuator, a pump, a first valve and a second valve. The hydraulic actuator may have a head end, a rod end, and a piston disposed therebetween. The pump may be a pump that pumps fluid to the head end of the actuator. The first valve may be fluidly coupled between the rod end of the actuator and the pump. The second valve may be fluidly coupled between the pump and the head end of the actuator. When the system is in a first configuration, the second valve may be downstream of the first valve and may be in a partially open position that restricts flow of a combined fluid, the combined fluid including fluid received from the pump and fluid received from the rod end of the actuator through the first valve. While the system is in the first configuration the head end may receive combined fluid.

In an embodiment, the system may further include a make-up circuit fluidly coupled to the head end of the actuator. While the system is in the first configuration, the head end may receive fluid from the make-up circuit.

In another embodiment, the system may have a second configuration in which the second valve may be downstream of the first valve and may be in an open position that allows the combined fluid to flow through the second valve. In a refinement, while the system is in the second configuration, the head end may receive substantially no fluid from the make-up circuit. In another refinement, the system may further include a controller, a first pressure sensor disposed between the rod end of the actuator and the first valve, and a second pressure sensor disposed between the second valve and the head end of the actuator. The first and second pressure sensors may be operably connected to the controller to send signals to the controller indicative of measured fluid pressure for the actuator. The controller may have a memory with a program stored therein that detects whether the hydraulic system is in an overrunning load condition, light resistive load condition or a heavy resistive load condition based, at least in part, on signals received by the controller from the first and second pressure sensors.

In an embodiment, the hydraulic system may actuate a boom coupled to a work implement.

In yet another aspect, a method for conserving energy in a hydraulic system is disclosed. The hydraulic system may include a pump, a hydraulic actuator, a fluid reservoir, a first valve, a second valve, and a third valve. The hydraulic actuator may include a head end, a rod end, and a piston disposed inside the actuator between the head end and the rod end. The piston may include a face proximal to the head end, and a back proximal to the rod end. The face may have a front surface area, and the back may have a back surface area. The first valve may be disposed between the rod end and the fluid reservoir, and may be disposed between the rod end and a second valve. The second valve may be disposed between the pump and the head end. The third valve between the rod end of the actuator and the compensation valve. The method may comprise receiving a first fluid pressure measurement of fluid in a fluid line connected to the actuator head end and a second fluid pressure measurement of fluid in a rod end line connected to the actuator rod end, receiving boom lever and bucket control commands, when (a) the boom lever command is to move the boom upward, (b) the bucket control commend is to dig, and (c) a head end actuator force is less than a rod end actuator force, substantially closing the first valve, combining fluid from the rod end with fluid from the pump to provide a combined fluid flow to the head end, and partially opening the second valve to restrict the flow of the combined fluid to the head end of the actuator, and reducing fluid flow from the pump to the head end, combining fluid flowing from the rod end with fluid flowing from the pump, restricting the flow of combined fluid to the head end, and using fluid flow from a make-up circuit to the head end.

In an embodiment, the method may further comprise reducing the fluid flow from the pump to the head end.

In another embodiment, the method may further comprise, when (a) the boom lever command is to move the boom upward, (b) the bucket control commend is to dig, and (c) the head end actuator force is greater than the rod end actuator force, substantially closing the first valve, combining fluid from the rod end with fluid from the pump, and opening the second valve to allow combined fluid to flow therethrough to the head end. In a refinement, the method may further comprise opening the third valve to allow fluid from the rod end to flow therethrough.

In another embodiment, the method may further comprise, when (a) the boom lever command is to move the boom upward, and (b) there are no active bucket control commends to dig, opening the first valve to allow fluid from the rod end to flow to the reservoir.

Although various features are disclosed in relation to specific exemplary embodiments, it is understood that the various features may be combined with each other, or used alone, with any of the various exemplary embodiments without departing from the scope of the disclosure.

These and other aspects and features will become more readily apparent upon reading the following detailed description when taken in conjunction with the accompanying drawings.

DETAILED DESCRIPTION

Figure 1:
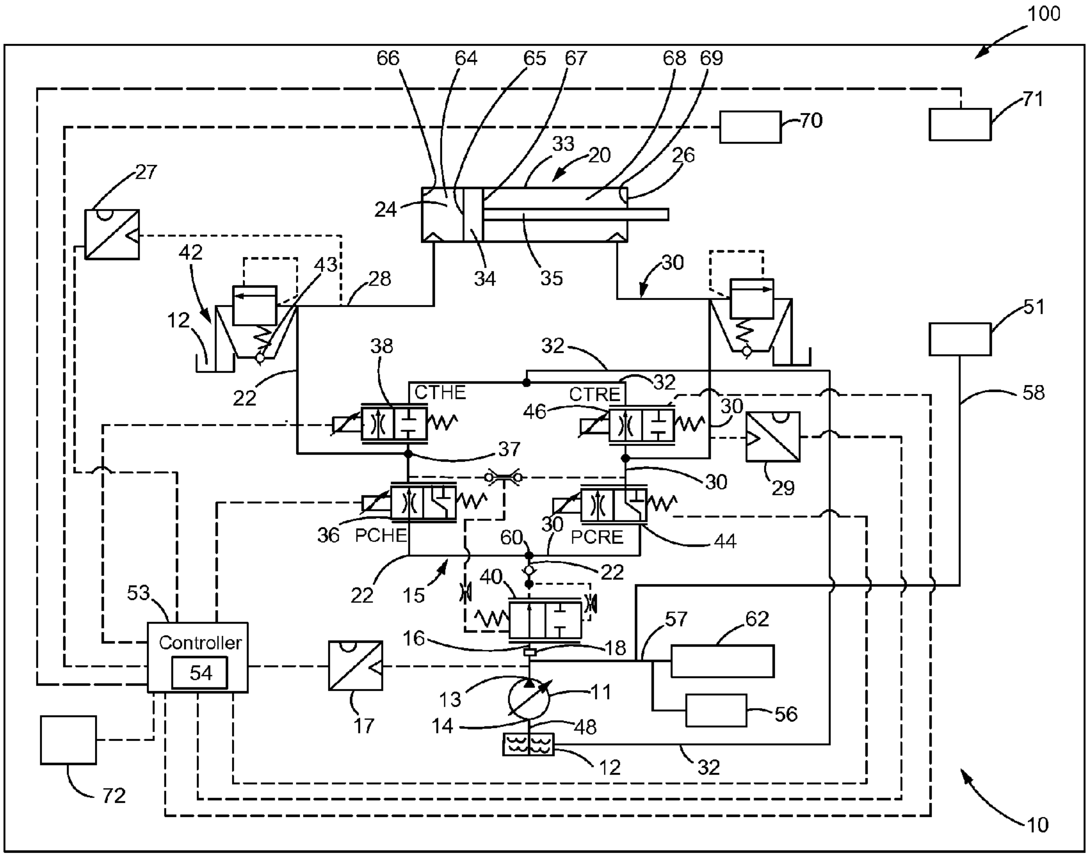
FIG. 1 is a schematic and diagrammatic representation of a hydraulic system configuration.
Figure 5:
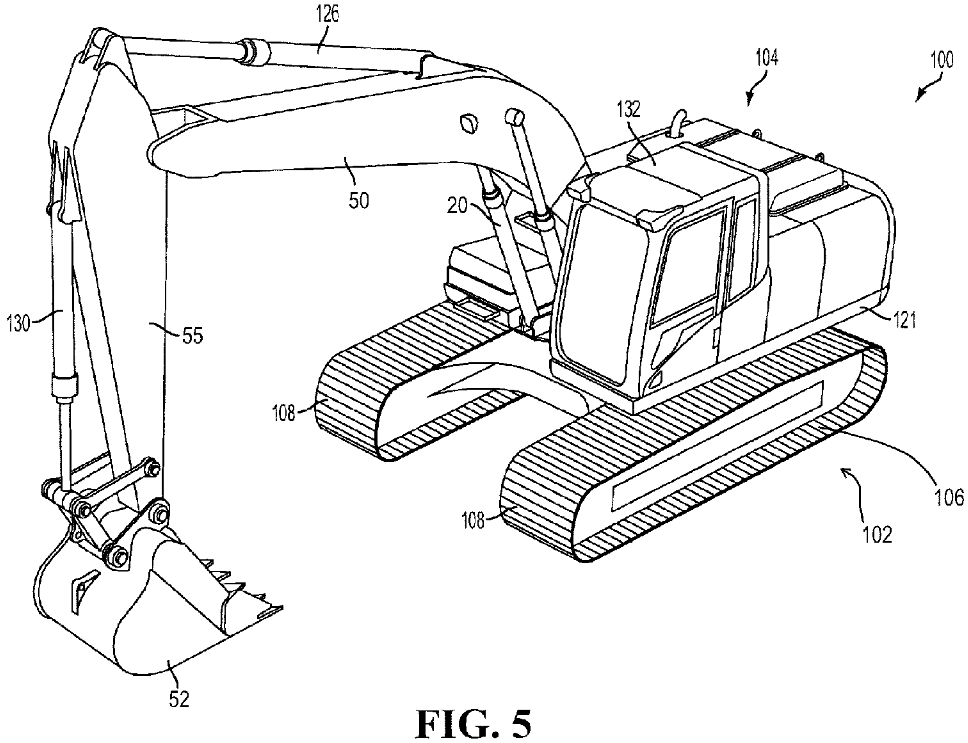
FIG. 5 is view of an embodiment of an exemplary vehicle in which a hydraulic system in accordance with the teachings of this disclosure may be used.

Turning to FIG. 1, a hydraulic system 10 is shown that may be part of an excavator, a backhoe loader or another piece of equipment utilizing a hydraulic system. FIG. 5 illustrates an example of a vehicle or machine 100 that incorporates the features of the present disclosure. The exemplary vehicle 100 in FIG. 5 is an excavator. The excavator 100 includes an undercarriage 102 and an upper structure 104. The undercarriage 102 includes a generally H-shaped frame 106 that supports two crawler tracks 108 along its edges and includes a post (not shown) supporting a ring gear (not shown) close to its center. The crawler tracks 108 are moved by sprockets that are rotated by hydraulic drive motors (not shown) or electric drive motors connected to the frame 106. The ring gear includes a plurality of teeth arranged long its inner periphery, which mesh with a drive sprocket powered by a swing motor (not shown). The swing motor may be connected to the upper structure 104 such that rotation of the drive sprocket causes the relative rotation of the upper structure 104 relative to the undercarriage 102. The upper structure 104 includes a boom 50 that is pivotally connected to an upper structure frame 121 and is pivoted by use of the two boom actuators 20. An arm, which is referred to herein as a stick 55, is pivotly connected at an end of the boom 50 and pivoted by an arm actuator 126. A bucket 52 is connected at the end of the arm 55 and is pivoted by a bucket actuator 130. The boom actuators 20, the arm actuator 126 and the bucket actuator 130 are embodied in the illustrations as linear hydraulic cylinders, which are configured to be extended and retracted by selective portion of pressurized fluid on one side of a hydraulic piston. The various functions of the machine 100 may be controlled in part the appropriate handling of various control devices by an operator occupying a cab 132. The swing motor may be powered by hydraulic or electric power.

Turning back to FIG. 1, the system 10 includes a pump 11, typically driven by a power source (not shown), such as an internal combustion engine, via a drive train or shaft (also not shown). In the exemplary embodiment shown in FIG. 1, the pump 11 may be a variable displacement and unidirectional pump. The pump 11 may be in communication with a fluid reservoir 12 that also serves as a drain as shown in FIG. 1. The pump 11 may include a rotatable cylinder barrel having multiple pistons bores (not shown), a tiltable swash plate (not shown), pistons (not shown) held against the tiltable swash plate, an outlet port 13 and an inlet port 14. A back pressure check valve 18 may be disposed in the pump outlet line 16. A pump pressure sensor 17 may be used to measure the pressure at the outlet 13 of the pump 11.

The system 10 may also include an actuator 20 that includes a head end 24 that is in fluid communication with the pump 11 via the fluid line 15. The fluid line 15 may extend from the pump 11 to the head end 24. Fluid line 15 may include pump outlet line 16, intermediate line 22 and actuator head end line 28. The pump outlet line 16 may extend from the pump 11 to a compensation valve 40. The intermediate line 22 may extend from the compensation valve 40 to a make-up circuit 42. The make-up circuit 42 may include a make-up valve 43 and may receive return fluid from other systems in the machine to reservoir 12 and under certain conditions provide such fluid to the head end 24 of the actuator 20 via the actuator head end line 28. The actuator head end line 28 may extend from the make-up circuit 42 to the head end 24 of the actuator 20. A actuator rod end line 30 may extend from the rod end 26 of the actuator 20 to the intermediate line 22. A reservoir line 32 may extend from valve 46 to the fluid reservoir 12. Pressure sensors 27, 29 may be used to measure the pressures in the fluid line 15 proximal to the head end 24, and in the actuator rod end line 30, respectively.

The system 10 may also include other functions such as a bucket circuit 51, a stick circuit 62, and another circuit 56 such as a swing circuit. The bucket circuit 51 may include bucket actuator 130 and may be fluidly coupled to the bucket 52. The stick circuit 62 may include arm actuator 126 and may be fluidly coupled to the stick 55. To this end, the system 10 may include one or more pumps 11 that direct combined pressurized fluid to one or more of the circuits. In one example, the pump 11 may be primarily associated with the boom 50 and the bucket circuit 51 and secondarily associated with the stick circuit 62 and the other circuit 56.

The actuator 20 may also be in communication with the reservoir 12. More specifically, the head end 24 of the actuator 20 may be in communication with the reservoir 12 via the fluid line 15 and the reservoir-to-pump line 48 as shown in FIG. 1. The rod end 26 of the actuator 20 may be in communication with the reservoir 12 via actuator rod end line 30 and reservoir line 32 as shown in FIG. 1.

The actuator 20 may include a generally cylindrical body 33 that accommodates a piston 34 that separates the head end 24 from the rod end 26 of the actuator 20. The piston 34 may also be connected to the rod 35 which, in turn, may be coupled to the piece of equipment being moved which may, for example, be the boom 50 of the machine that can perform a digging operation such as an excavator, backhoe, etc. The piston 34 may be moveable between an extended position and a refracted position, as is known in the art. The actuator 20 includes an internal head end compartment 64 and an internal rod end compartment 68. The head end compartment 64 is bounded by the head end wall 66 and the face 65 of the piston 34. The rod end compartment 68 is bounded by the back 67 of the piston 34 and the rod end wall 69. The back 67 is generally considered to be circumferentially encircling the rod 35. The surface area $A_H$ of the face 65 is typically larger than the surface area $A_R$ of the back 67 because of the area covered by the connection of the rod 35 to the back 67.

As noted above, the boom 50 may be coupled to a work implement 52, such as a bucket 52. FIG. 1 further illustrates communication between the pump 11 and the stick circuit 62 and another circuit 56 via line 57 and communication between the pump 11 and the bucket circuit 51 via the bucket line 58. Further, FIG. 1 also illustrates communication between the pressure sensors 17, 27, 29, the valves 36, 38, 44, 46 and the pump 11 with a controller 53.

FIG. 1 illustrates a series of valves. Traditionally, during "digging," typically when the boom is being raised, the pump may "pump" fluid from the reservoir 12 to the head end 24 of the actuator 20 to move the piston 34 within the body 33 and the rod 35 outside of the body 33 of the actuator 20. When pumping fluid from the reservoir 12 to the head end 24 of the actuator 20, the pump 11 pumps pressurized fluid past the check valve 18 in pump outlet line 16, through compensation valve 40, and through valve 36, which will hereinafter be referred to as the pump-cylinder-head-end (PCHE) valve 36. Usually, when pumping fluid into the head end 24 of the actuator 20, the PCHE valve 36 is open, and valve 38, which will be referred to as the cylinder-tank-head-end (CTHE) valve 38, is closed. With the CTHE valve 38 closed, fluid may flow through the PCHE valve 36, through the intermediate line 22, past junction 37, and through the head inlet line 28 into the head end 24 of the actuator 20. Pressurized fluid may leave the rod end 26 of the actuator 20 via the actuator rod end line 30. Valve 44, which will be referred to as the pump-cylinder-rod-end (PCRE) valve 44, is closed and valve 46, which will be referred to as the cylinder-tank-rod-end (CTRE) valve 46, is open. The pressurized fluid flows from the rod end 26 of the actuator 20 through the actuator rod end line 30, through the CTRE valve 46, and through the reservoir line 32 to the reservoir 12.

Generally, during the digging phase, the boom 50 is typically held in place and the pump 11 demand is driven by the implement 52, and the like. During the digging phase, the pressure in the rod end 26 of the actuator 20 is substantially higher than in the head end 24. Fluid from pump 11 (at a substantially high pressure) is delivered to the bucket circuit 51 to support the digging operation. In the absence of boom 50 movement, the pressurized fluid delivered to the actuator 20 is about zero.

At some point, the machine may transition to the digging-boom-up-overrunning-load phase. During this phase, the implement 52 is actively digging but the boom 50 is being raised a relatively small distance from a lower position to a higher position. Typically, this small upward movement may be utilized to improve the digging load condition. In this situation, the reaction force $F_D$ on the boom 50 (induced by the bucket 52 through the stick 55) from the digging contact with the ground is greater than the resistive force of gravity $F_G$, which acts in opposition to the small upward movement of the boom 50, resulting in a net force $F_N$ in the general direction of the reaction force $F_D$. In this scenario, the force on the actuator 20 at the rod end 26 (the "rod end actuator force") is greater than the force on the actuator 20 at the head end 24 (the "head end actuator force"). The head end actuator force may be defined as equivalent to the surface area of the face of the piston $A_H$ times the pressure of the fluid at the head end 24. The rod end actuator force may be defined as equivalent to the surface area of the back of the piston $A_R$ times the pressure of the fluid at the rod end 26. Given that the surface area of the face $A_H$ is greater than that of the back $A_R$, it follows that, in this scenario, the fluid pressure in the fluid line 15 proximal to the head end 24 is less than the fluid pressure in the actuator rod end line 30 proximal to the rod end 26. (While there may be a relatively high fluid pressure at the rod end 26 of the actuator 20, there may often be almost zero fluid pressure at the head end 24.) The net force $F_N$ moves the boom 50 upward in the general direction of the reaction force $F_D$ (induced by the bucket 52 interaction with the ground). The above factors result in a load condition that is regarded as an overrunning load condition. During such, the pump 11 continues to provide a flow of highly pressurized fluid to the bucket 52 to continue digging and must also provide a flow of highly pressurized fluid to the head end 24, which is at a substantially lower pressure, to avoid actuator voiding.

In hydraulic systems, the compensation valve 40 may, as is known in the art, be utilized to reduce the pressurization level of fluid flowing to the head end 24 from the pressure level that is provided to the bucket circuit 51 during an overrunning load condition. This modulation, or reduction, of the pressure of the fluid provided to the head end 24 results in energy losses and lower energy efficiency for the hydraulic system. The compensation valve 40 may be a hydro-mechanically actuated proportional control valve and may be configured to control a pressure of the fluid supplied to regeneration junction 60. In one embodiment, compensation valve 40 may include a valve element that is spring biased and hydraulically biased toward a flow passing position and moveable by hydraulic pressure toward a flow blocking position. Alternatively, compensation valve 40 may include a valve element that is spring biased and hydraulically biased toward a flow blocking position and moveable by hydraulic pressure toward a flow passing position.

The energy conservation aspects of the system 10 when the actuator 20 is operating under an overrunning load condition will now be explained. To minimize energy loss due to pressure modulation by the compensation valve 40, the controller 53 may be equipped with a memory 54 including software that can detect the overrunning load condition (digging-boom-up-overrunning-load phase), and implement, for the hydraulic system 10, the configuration shown in FIG. 2.

Figure 2:
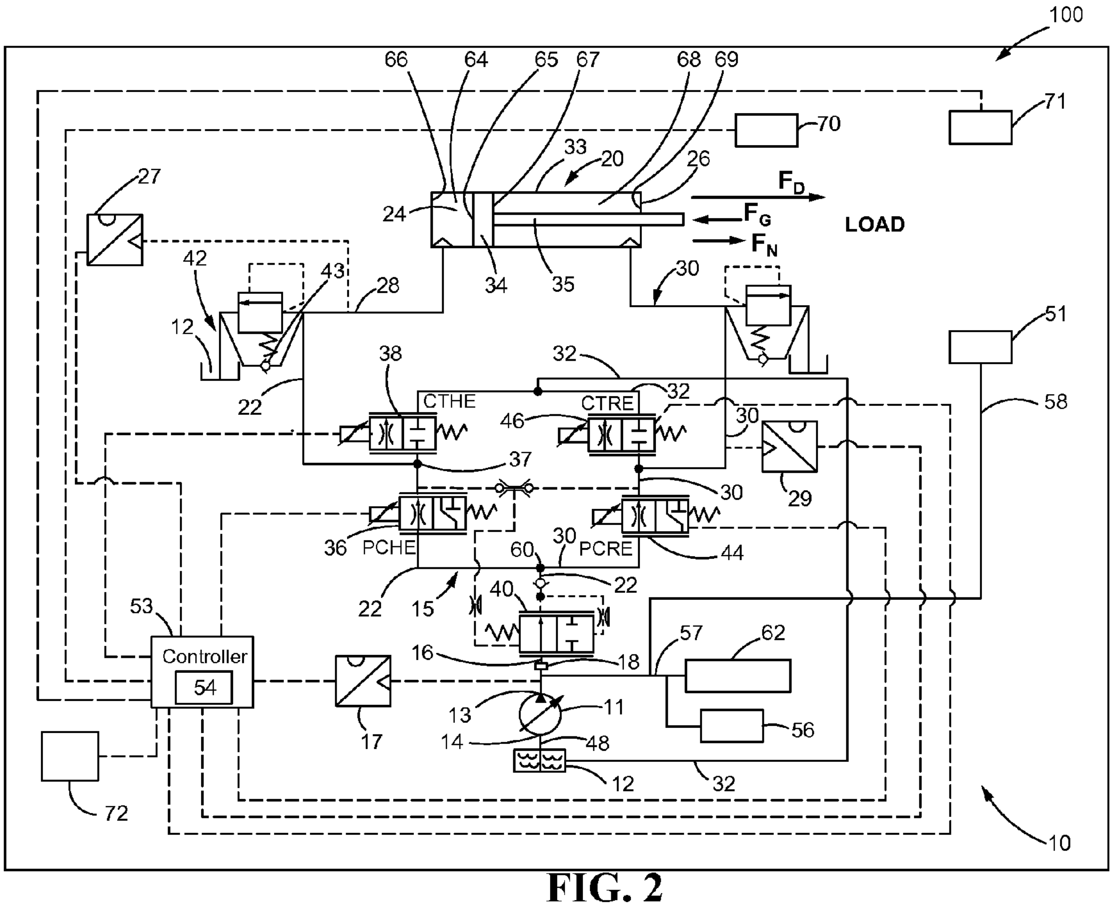
FIG. 2 is a schematic and diagrammatic representation of the hydraulic system configuration in the overrunning load condition (digging-boom-up-overrunning-load phase)

In the configuration of FIG. 2, the CTRE valve 46 is either fully closed or substantially closed to reduce rod end 26 flow to the reservoir 12 and the PCRE valve 44 is placed in an open, or partially open, position by the controller 53 to redirect rod end 26 flow to the head end 24. The PCHE valve 36 is placed by the controller 53 in a partially open position (partially closed position) that allows less flow than that needed by the head end 24 to perform the function requested by the operator. The CTHE valve 38 is closed.

In the configuration of FIG. 2, pressurized fluid leaves the rod end 26 of the actuator 20 via the actuator rod end line 30. Since the CTRE valve 46 is either fully closed or substantially closed, the pressurized fluid from the rod end 26 flows through the actuator rod end line 30 to the open PCRE valve 44, passes through the PCRE valve 44 and flows to fluid line 15 at regeneration junction 60. The fluid from rod end 26 that flows into regeneration junction 60 may be referred to herein as "regenerated fluid". In one embodiment, such regenerated fluid may be combined with the fluid from the pump 11 (the "combined fluid") at regeneration junction 60. The combined fluid may flow to the PCHE valve 36, which has been placed in a partially open (partially closed) position as explained above. Such combined fluid flows from the PCHE valve 36, through the intermediate line 22, and through the actuator head end line 28 to the head end 24 of the actuator 20. Because the PCHE valve 36 opening is partially reduced, the flow of combined fluid through the PCHE valve 36 is also partially reduced and results in a reduced flow of combined fluid to the head end 24 of the actuator 20. Make-up flow from the make-up circuit 42 may also be used to supplement the combined fluid flow to the head end 24. As used herein, the fluid from the make-up circuit 42 may be referred to as "make-up fluid". In another embodiment, the fluid received by the head end 24 of the actuator may be combined fluid substantially without make-up fluid. In yet another embodiment, the fluid received by the head end 24 of the actuator may be regenerated fluid and make-up fluid substantially without fluid from the pump.

The configuration of the hydraulic system 10 in FIG. 2 during an overrunning load condition, minimizes energy loss at the compensation valve 40 because the configuration of FIG. 2 allows a smaller volume of fluid to be provided by the pump 11 than would otherwise be provided in the absence of supplementing the amount of the fluid provided to the head end 24 with regenerated fluid and/or make-up fluid. Power loss due to modulation by the compensation valve 40 of the pressure of the fluid provided by the pump 11 may be calculated by the following equation: Power Loss=Q*ΔP, where Q is the flow rate of the fluid and AP is the pressure difference between the fluid at the pump outlet port 13 and the fluid (post compensation valve 40) provided by the pump to the head end 24 of the boom actuator 20. Since the utilization of regenerated fluid and make-up fluid allows a lower amount of fluid flow to be provided by the pump 11, there is less power lost when the compensation valve 40 drops the relatively high pressure of the pumped fluid (from the pump 11) to a lower pressure appropriate for the boom 50 operation. The configuration of FIG. 2 also provides an anti-voiding strategy for the head end of the actuator during the overrunning load condition.

At some point, in the digging cycle, the machine may transition to the digging-boom-up-light-resistive-load phase. During this phase, the implement 52 is digging and the boom 50 is being raised from a lower position to a higher position. What sets this apart from the digging-boom-up-overrunning-load phase is that in the digging-boom-up-light-resistive-load phase, the reaction force $F_D$ on the boom 50 (induced by the bucket 52 and stick 55) from digging is less than the resistive force of gravity $F_G$ that acts in opposition to the upward movement of the boom 50. The head end actuator force is somewhat greater than the rod end actuator force. The fluid pressure in the fluid line 15 proximal to the head end 24 is generally smaller than the fluid pressure in the actuator rod end line 30 proximal to the rod end 26. The above is known as a light-resistive load condition. The pump 11 provides a flow of highly pressurized fluid to the bucket 52 to continue digging and also provides a flow of pressurized fluid to the head end 24 of the actuator.

The energy conservation aspects of the system 10 when the actuator 20 is operating under a light-resistive load condition will now be explained. To minimize energy loss due to pressure modulation by the compensator valve 40, the controller 53 may be equipped with a memory 54 including software that can detect the light-resistive load condition, and implement, for the hydraulic system 10, the configuration shown in FIG. 3.

Figure 3:
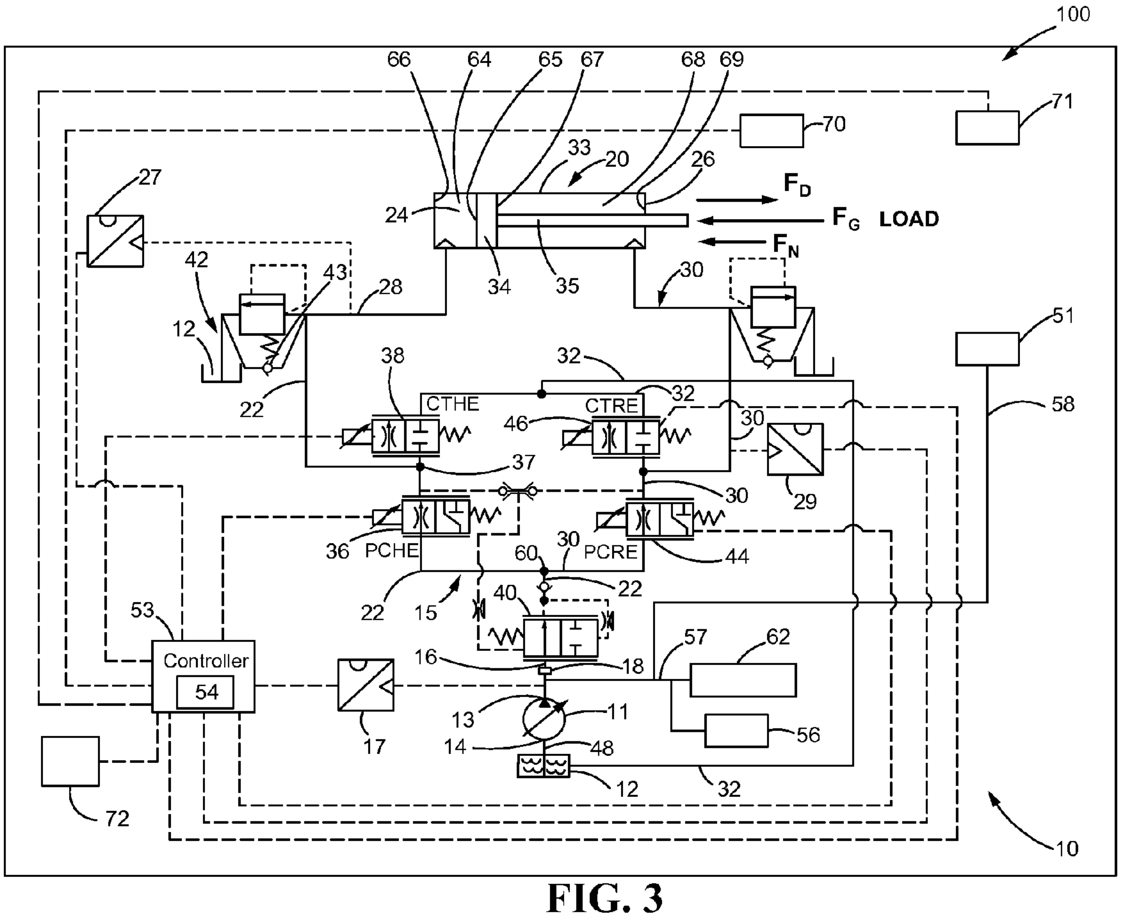
FIG. 3 is a schematic and diagrammatic representation of the hydraulic system configuration in the light resistive load condition (digging-boom-up-light-resistive-load phase)

In the configuration of FIG. 3, the CTRE valve 46 is either fully closed or substantially closed to reduce rod end 26 flow to the reservoir 12, the PCRE valve 44 is open, or partially open, to redirect rod end 26 flow to the head end 24. The PCHE valve 36 is open, or partially open, to meet the flow demand required by the boom operation.

In the configuration of FIG. 3, pressurized fluid leaves the rod end 26 of the actuator 20 via the actuator rod end line 30. Since the CTRE valve 46 is either fully closed or substantially closed, the pressurized fluid from the rod end 26 flows through the actuator rod end line 30 to the PCRE valve 44, passes through the open PCRE valve 44 and flows to fluid line 15 at regeneration junction 60. Such pressurized regenerated fluid is combined with the pressurized fluid from the pump 11 (combined fluid) at regeneration junction 60. The combined fluid flows through the open PCHE valve 36. The combined fluid flows from the PCHE valve 36, through the intermediate line 22, and through the head inlet line 28 to the head end 24 of the actuator 20. Make-up fluid does not enter the head end 24 of the actuator 20 because the head end 24 pressure is higher than the pressure of the make-up fluid. Because the combined fluid through the PCHE valve 36 is not supplemented by the make-up fluid, the pump 11 must provide a greater flow rate as compared to (the flow rate provided by the pump 11) when the load condition was in an overrunning load condition.

The configuration of the hydraulic system 10 in FIG. 3, during a digging-boom-up-light-resistive-load phase (light-resistive load condition), minimizes energy loss at the compensation valve 40 because the configuration of FIG. 3 allows a smaller volume of fluid to be provided by the pump 11 than would otherwise be provided in the absence of supplementing the fluid provided to the head end 24 with regenerated fluid. Since the utilization of pressurized regenerated fluid allows a lower amount of fluid flow to be provided by the pump 11, there is less power lost when the compensation valve 40 drops the relatively high pressure of the pumped fluid to a lower pressure appropriate for the boom 50 operation.

At some point, in the digging cycle, the machine may transition to the boom-lift phase (heavy-resistive load condition). During this phase, the implement 52 is not digging and the boom 50 is being moved. In this boom-lift phase, the pump 11 provides a flow of pressurized fluid to the head end 24 of the actuator. In the exemplary embodiment, since there is no digging, the pressure of the fluid provided by the pump 11 may be substantially controlled by the requirements of the actuator 20 for the boom 50, thus, typically there may be no substantial power lost through use of the compensation valve 40. The head end actuator force, when there is a heavy load, is greater than the rod end actuator force by at least a predetermined value. The pressure in the fluid line 15 proximal to the head end 24 of the actuator 20 is greater than the fluid pressure in the rod end line 30 proximal to the rod end 26. The fluid pressure in the fluid line 15 proximal to the head end 24 may be about the same as the fluid pressure in the pump outlet line 16. For example, the fluid pressure in the fluid line 15 proximal to the head end 24 may be in a range from about equal to the fluid pressure in the pump outlet line 16 to about ninety (90) percent of the fluid pressure in the pump outlet line 16. In another embodiment, the fluid pressure in the fluid line 15 proximal to the head end 24 may be in a range from about equal to the fluid pressure in the pump outlet line 16 to about ninety-five (95) percent of the fluid pressure in the pump outlet line 16. In yet another embodiment, the fluid pressure in the fluid line 15 proximal to the head end 24 may be in a range from about equal to the fluid pressure in the pump outlet line 16 to about ninety-eight (98) percent of the fluid pressure in the pump outlet line 16. The above is known as a heavy-resistive load condition. The controller 53 may be equipped with a memory 54, including software, that can detect the transition to the heavy-resistive load condition, and implement, for the hydraulic system 10 the configuration of FIG. 1.

The valves disclose herein may be hydraulically controlled with hydraulic actuators and return springs which maintain the valves in a normally closed positions or may be electrically controlled by solenoids as can be appreciated by those skilled in the art.

Figure 4:
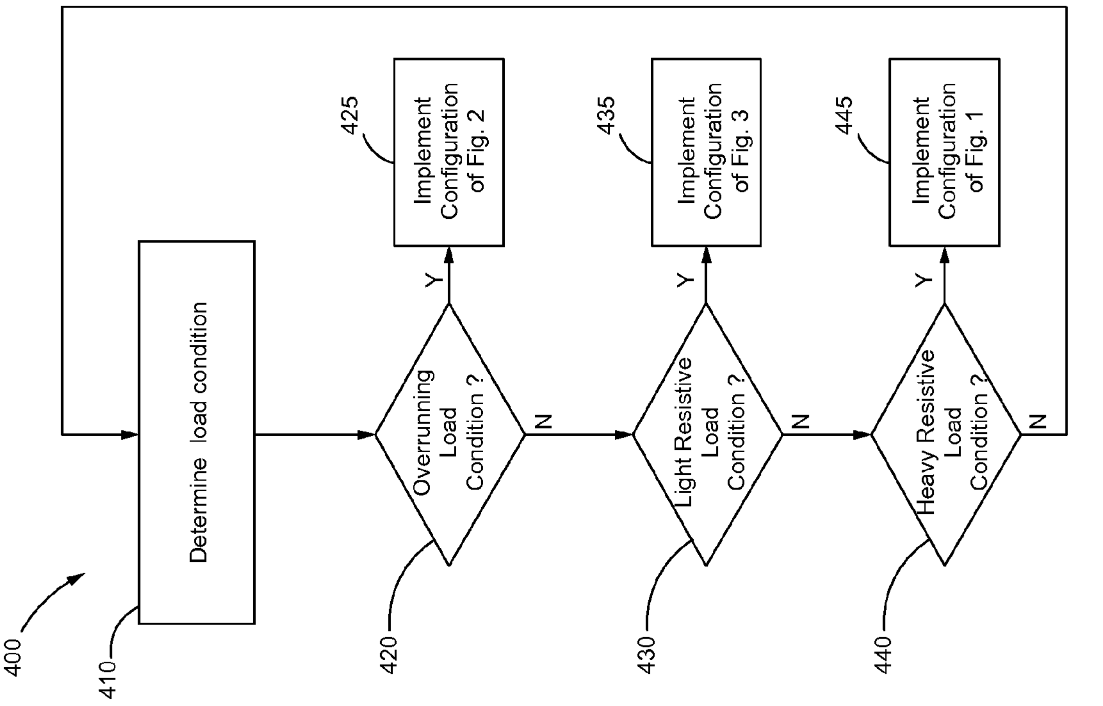
FIG. 4 is a flow chart illustrating an exemplary method for conserving energy in the hydraulic system.

Also disclosed is a method 400 for conserving energy in the hydraulic system 10. The flow chart in FIG. 4 illustrates this method 400. In block 410, the controller 53 may determine the load condition. The controller 53 may receive a boom lever command instigated at the joystick or boom lever 70 (lever, switch, button, and the like) by the operator of the machine. The controller 53 may also receive a bucket control command from a bucket control actuator 71 (for example, a lever, joystick, switch, button, and the like) and a stick control command from a stick control actuator 72. Such commands may result in or cause the bucket 52 to dig or the boom to move in an upward direction. In addition, the controller 53 receives: from the pump pressure sensor 17 disposed on the pump outlet line 16, a measurement of the fluid pressure of the fluid in the pump outlet line 16; from the pressure sensor 27 disposed on the fluid line 15 proximal to the head end 24, the measurement of the fluid pressure at the head end 24 of the boom actuator 20; and from the pressure sensor 29 disposed on the rod end line 30, the measurement of the fluid pressure at the rod end 26 of the boom actuator 20.

If the boom lever command is to raise the boom, the bucket and/or stick control commands are to dig, and the head end actuator force (the pressure of the fluid (in fluid line 15 or head end line 28) proximal to the actuator head end 24 times the surface area $A_H$ of the face 65 of the piston 34) is less than the rod end actuator force (the pressure of the fluid (in the actuator rod end line 30) proximal to the actuator rod end 26 times the surface area $A_R$ of the back 67 of the piston 34), the controller 53 determines that the load condition is the overrunning load condition. The controller may, in some embodiments, also determine whether the pressure of the fluid proximal to the actuator head end 24 is less than the pressure of the fluid proximal to the actuator rod end 26 before determining that the load condition is an overrunning load condition.

If the boom lever command is to raise the boom, the bucket and/or stick control commands are to dig, and the head end actuator force (the pressure of the fluid proximal to the actuator head end 24 times the surface area $A_H$ of the face 65 of the piston 34) is greater than the rod end actuator force (the pressure of the fluid proximal to the actuator rod end 26 times the surface area $A_R$ of the back 67 of the piston 34), the controller 53 determines that the load condition is the light-resistive load condition. The controller may, in some embodiments, also determine whether the pressure of the fluid proximal to the actuator head end 24 is less than the pressure of the fluid proximal to the actuator rod end 26 before determining that the load condition is a light-resistive load condition.

If the boom lever command is to raise the boom, there are no bucket and/or stick control commands to dig, the head end actuator force (the pressure of the fluid proximal to the actuator head end 24 times the surface area $A_H$ of the face 65 of the piston 34) is greater than the rod end actuator force (the pressure of the fluid proximal to the actuator rod end 26 times the surface area $A_R$ of the back 67 of the piston 34) by at least a predetermined value, and the pressure of the fluid in the fluid line 15 proximal to the head end (or actuator head end line 28) is within a range of the pressure of the fluid in the pump outlet line 16 (an initial pressure of fluid output from the pump 11) the controller 53 determines that the load condition is the heavy-resistive load condition. The controller, in some embodiments, may alternatively or also consider whether the pressure of the fluid in the fluid line 15 proximal to the head end (or actuator head end line 28) is greater than the pressure of the fluid in the rod end line 30 in its determination of the heavy-resistive load condition. With regard to the range referred to above, in an embodiment, the fluid pressure in the fluid line 15 proximal to the head end 24 may be in a range from about equal to the fluid pressure in the pump outlet line 16 to about ninety (90) percent of the fluid pressure in the pump outlet line 16. In another embodiment, the fluid pressure in the fluid line 15 proximal to the head end 24 may be in a range from about equal to the fluid pressure in the pump outlet line 16 to about ninety-five (95) percent of the fluid pressure in the pump outlet line 16. In yet another embodiment, the fluid pressure in the fluid line 15 proximal to the head end 24 may be in a range from about equal to the fluid pressure in the pump outlet line 16 to about ninety-eight (98) percent of the fluid pressure in the pump outlet line 16.

If the load condition is determined to be an overrunning load condition in blocks 410-420, the controller, in block 425 implements the configuration of FIG. 2. If the load condition is determined to be a light-resistive load condition in blocks 410 and 430, the controller, in block 435, implements the configuration of FIG. 3. If the load condition is determined to be a heavy-resistive load condition in blocks 410 and 440, the controller, in block 445, implements the valve arrangement illustrated in the configuration of FIG. 1.

Figure 6:
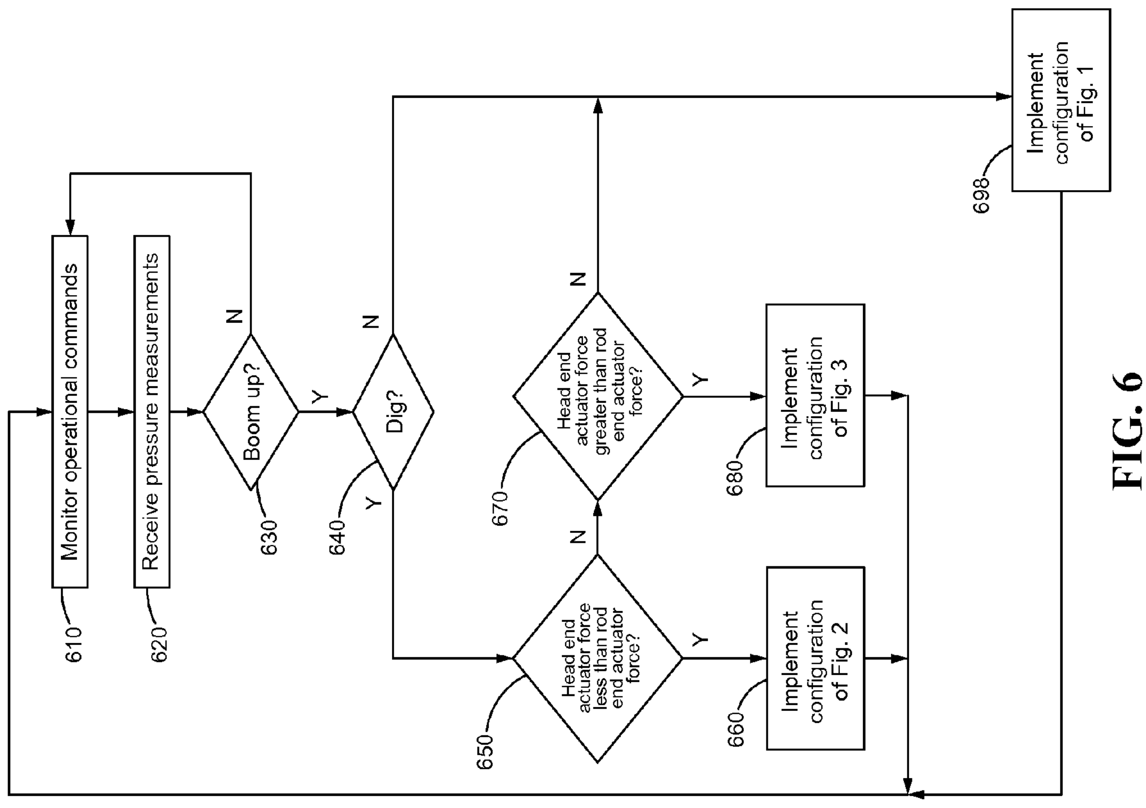
FIG. 6 is a flow chart illustrating an alternative exemplary method for conserving energy in the hydraulic system.

Also disclosed is another method 600 for conserving energy in the hydraulic system 10. The flow chart in FIG. 6 illustrates this method 600. In block 610, the controller 53 may receive operational commands related to the operation and/or position of the boom 50, bucket 52 or stick 55. For example, the controller 53 may receive a boom lever command instigated at the joystick or boom lever 70 (lever, switch, button, and the like) by the operator of the machine to control the boom 50. The controller 53 may also receive a bucket control command from a bucket control actuator 71 (for example, a lever, joystick, switch, button, and the like) to control the bucket 52, and a stick control command from a stick control actuator 72 to control the stick 55. Such commands may result in or cause the bucket 52 to dig. In addition, in block 620, the controller may receive pressure measurements: from the pump pressure sensor 17 disposed on the pump outlet line 16, a measurement of the fluid pressure of the fluid in the pump outlet line 16; from the pressure sensor 27 disposed on the fluid line 15 proximal to the head end 24, the measurement of the fluid pressure at the head end 24 of the boom actuator 20; and from the pressure sensor 29 disposed on the rod end line 30, the measurement of the fluid pressure at the rod end 26 of the boom actuator 20.

If the boom lever command is to raise the boom 50 in block 630, and the bucket control command in block 640 is to dig, and, in block 650, the head end actuator force (the pressure of the fluid (in fluid line 15 or head end line 28) proximal to the actuator head end 24 times the surface area $A_H$ of the face 65 of the piston 34) is less than the rod end actuator force (the pressure of the fluid (in the actuator rod end line 30) proximal to the actuator rod end 26 times the surface area $A_R$ of the back 67 of the piston 34), the controller 53 in block 660 implements the configuration of FIG. 2.

If the boom lever command is to raise the boom 50 in block 630, and the bucket control command is to dig in block 640, and the head end actuator force (the pressure of the fluid proximal to the actuator head end 24 times the surface area $A_H$ of the face 65 of the piston 34) is greater than the rod end actuator force (the pressure of the fluid proximal to the actuator rod end 26 times the surface area $A_R$ of the back 67 of the piston 34) (see blocks in block 650-670), the controller in block 680 implements the configuration of FIG. 3.

If the boom lever command is to raise the boom 50 in block 630, and there are no active bucket control commands to dig in block 640, the controller 53, in block 698, implements the configuration of FIG.1.

Industrial Applicability

Accordingly, hydraulic systems and methods are disclosed for conserving energy by rod end to head end flow regeneration when an actuator, such as a boom actuator, has an overrunning load condition or a light-resistive load condition. Such hydraulic systems may be utilized in machines, such as e.g., an excavator, a backhoe, a hydraulic shovel, or other types of machines known in the art.

Regenerated fluid and make-up fluid may be used in the overrunning load condition to supplement pressurized fluid provided by the pump. Regenerated fluid may be used in the light-resistive load condition to supplement pressurized fluid provided by the pump. In both scenarios, the use of such pressurized fluid(s) reduces the flow rate of fluid provided by the pump and increases the efficiency of the system by reducing energy losses due to pressure modulation by the compensation valve.

What is claimed is:

1. A method for conserving energy in a hydraulic system including:

a pump, a hydraulic actuator including a head end, a rod end, and a piston disposed inside the actuator between head end and the rod end, a first valve disposed between the rod end and a fluid reservoir, and disposed between the rod end and a second valve, and the second valve disposed between the pump and the head end, the method comprising:

determining when the hydraulic system is in an overrunning load condition, a light-resistive load condition or a heavy-resistive load condition; and when the hydraulic system enters the overrunning load condition, receiving by the head end regenerated fluid.

2. The method of claim 1, further comprising, when the hydraulic system enters the overrunning load condition, closing the first valve and combining fluid flowing from the rod end with fluid flowing from the pump, and receiving by the head end fluid flow from a make-up circuit.

3. The method of claim 2, further comprising restricting the flow of combined fluid to the head end by partially closing the second valve.

4. The method of claim 3, further comprising: when the hydraulic system enters the light resistive load condition from the overrunning load condition, decreasing the restriction of the combined fluid through the second valve, increasing the fluid flow from the pump to the head end of the actuator, and reducing fluid flow to about zero from the make-up circuit to the head end.

5. The method of claim 1, further comprising:

determining when the hydraulic system transitions from the light-resistive load condition to the heavy-resistive load condition; and as a result of determining the transition from the light resistive load condition to the heavy resistive load condition, opening the first valve to allow fluid from the rod end to flow to the reservoir.

6. The method of claim 1, further comprising receiving a first fluid pressure measurement of fluid in a fluid line connected to the actuator head end and a second fluid pressure measurement of fluid in a rod end line connected to the actuator rod end; and estimating load condition based at least in part on a comparison of a head end actuator force to a rod end actuator force, the head end actuator force determined by the first fluid pressure measurement times a front surface area of a face of the piston, the rod end actuator force determined by the second fluid pressure measurement times a back surface area of a back of the piston, the face of the piston proximal to the head end, the back of the piston proximal to the rod end.

7. The method of claim 6, wherein a transition to the heavy-resistive load is detected when (a) the head end actuator force is greater than the rod end actuator force; and (b) the first fluid pressure measurement is in a range of about an initial pressure of the fluid output from the pump to about ninety percent of the initial pressure of the fluid output from the pump.

8. The method of claim 6, wherein a transition to the light-resistive load is detected when the head end actuator force is greater than the rod end actuator force.

9. The method of claim 1, in which the hydraulic system further includes a third valve between the rod end of the actuator and the compensation valve, wherein the method further includes:

opening the third valve when the first valve is substantially closed; and receiving, by the third valve, fluid from the rod end when the first valve is substantially closed.

10. A hydraulic system comprising:

a hydraulic actuator having a head end, a rod end, and a piston disposed therebetween;

a pump that pumps fluid to the head end of the actuator;

a first valve fluidly coupled between the rod end of the actuator and the pump; and a second valve fluidly coupled between the pump and the head end of the actuator;

wherein when the system is in a first configuration, the second valve is downstream of the first valve and is in a partially open position that restricts flow of a combined fluid, the combined fluid including fluid received from the pump and fluid received from the rod end of the actuator through the first valve, wherein further, while the system is in the first configuration the head end receives combined fluid.

11. The system of claim 10, further including a make-up circuit fluidly coupled to the head end of the actuator, wherein while the system is in the first configuration, the head end receives fluid from the make-up circuit.

12. The system of claim 10, wherein the system has a second configuration in which the second valve is downstream of the first valve and is in an open position that allows the combined fluid to flow through the second valve.

13. The system of claim 12, wherein while the system is in the second configuration, the head end receives substantially no fluid from the make-up circuit.

14. The system of claim 12, further including:

a controller;

a first pressure sensor disposed between the rod end of the actuator and the first valve; and a second pressure sensor disposed between the second valve and the head end of the actuator, wherein the first and second pressure sensors are operably connected to the controller to send signals to the controller indicative of measured fluid pressure for the actuator, wherein the controller has a memory with a program stored therein that detects whether the hydraulic system is in an overrunning load condition, light resistive load condition or a heavy resistive load condition based, at least in part, on signals received by the controller from the first and second pressure sensors.

15. The system of claim 10, the hydraulic system actuates a boom coupled to a work implement.

16. A method for conserving energy in a hydraulic system including:

a pump, a hydraulic actuator including a head end, a rod end, and a piston disposed inside the actuator between the head end and the rod end, the piston including a face proximal to the head end, and a back proximal to the rod end, the face having a front surface area, the back having a back surface area, a fluid reservoir, a first valve disposed between the rod end and the fluid reservoir, and disposed between the rod end and a second valve, and the second valve disposed between the pump and the head end, a third valve between the rod end of the actuator and the compensation valve, the method comprising:

receiving a first fluid pressure measurement of fluid in a fluid line connected to the actuator head end and a second fluid pressure measurement of fluid in a rod end line connected to the actuator rod end; and receiving boom lever and bucket control commands;

when (a) the boom lever command is to move the boom upward, (b) the bucket control command is to dig, and (c) a head end actuator force is less than a rod end actuator force, substantially closing the first valve, combining fluid from the rod end with fluid from the pump to provide a combined fluid flow to the head end, and partially opening the second valve to restrict the flow of the combined fluid to the head end of the actuator; and reducing fluid flow from the pump to the head end, combining fluid flowing from the rod end with fluid flowing from the pump, restricting the flow of combined fluid to the head end, and using fluid flow from a make-up circuit to the head end.

17. The method of claim 16, further comprising reducing the fluid flow from the pump to the head end.

18. The method of claim 16, further comprising:

when (a) the boom lever command is to move the boom upward, (b) the bucket control command is to dig, and (c) the head end actuator force is greater than the rod end actuator force, substantially closing the first valve, combining fluid from the rod end with fluid from the pump, and opening the second valve to allow combined fluid to flow therethrough to the head end.

19. The method of claim 18, further comprising opening the third valve to allow fluid from the rod end to flow therethrough.

20. The method of claim 16, further comprising:

when (a) the boom lever command is to move the boom upward, and (b) there are no active bucket control commands to dig, opening the first valve to allow fluid from the rod end to flow to the reservoir.

* * * * *